United States Patent [19]

Abdelli

[11] Patent Number: 5,136,250

[45] Date of Patent: Aug. 4, 1992

[54] CAPACITANCE HEIGHT GAUGE

[75] Inventor: Said Abdelli, Minneapolis, Minn.

[73] Assignee: Seagate Technology, Inc., Scotts Valley, Calif.

[21] Appl. No.: 563,867

[22] Filed: Aug. 7, 1990

Related U.S. Application Data

[63] Continuation of Ser. No. 345,207, Apr. 28, 1989, abandoned.

[51] Int. Cl.$^5$ .............................................. G01B 7/14
[52] U.S. Cl. ................................... 324/661; 307/300; 324/662
[58] Field of Search ................ 324/661, 690, 662; 340/870.37; 328/184; 307/296.1, 300

[56] References Cited

U.S. PATENT DOCUMENTS

| | | | |
|---|---|---|---|
| 3,019,897 | 2/1962 | Barber et al. | 324/61 P |
| 3,408,566 | 10/1968 | Norwich | 324/61 R |
| 4,152,641 | 5/1979 | Hughes et al. | 324/661 |
| 4,499,640 | 2/1985 | Brenton et al. | 324/61 P |
| 4,499,767 | 2/1985 | Fathauer et al. | 324/61 R |
| 4,545,020 | 10/1985 | Brasfield | 364/509 |
| 4,676,100 | 6/1987 | Eichberger | 73/304 |
| 4,677,320 | 6/1987 | Hannington | 307/300 |
| 4,733,235 | 3/1988 | Baer et al. | 340/870.37 |
| 4,743,838 | 5/1988 | Eckerle | 324/61 R |
| 4,806,848 | 2/1989 | Demers | 324/61 R |
| 4,888,824 | 12/1988 | Andersen et al. | 324/690 |
| 4,944,028 | 7/1990 | Iijima et al. | 324/661 |

OTHER PUBLICATIONS

Inmac, 51st Ed., Apr. 1986 Complete Cross-Reference Catalog pp. 130–131.

*Primary Examiner*—Kenneth A. Wieder
*Assistant Examiner*—Maura K. Regan
*Attorney, Agent, or Firm*—Kinney & Lange

[57] ABSTRACT

A capacitance-type height gage for measuring the distance between a test probe and a surface includes comparison circuitry for detecting the phase angle difference between the test probe signal and a reference signal. The reference signal having an adjustable phase angle. Phase angle comparison is achieved by multiplying the test probe signal with the reference signal and filtering the output. The filtered output is inversely proportional to the distance between the test probe and the surface. Compensation circuitry is included for cancelling stray capacitance.

2 Claims, 7 Drawing Sheets

CAPACITANCE HEIGHT GAUGE

This is a continuation of application Ser. No. 07/345,207 filed on Apr. 28, 1989, abandoned as of the date of this application.

BACKGROUND OF THE INVENTION

1. Field of the Invention

The present invention relates to measuring height based upon changes in the phase shift of an AC signal due to capacitive variations.

2. Description of the Prior Art

In the production of magnetic storage disks, (for use as computer storage media, for example) it is useful to make non-contact measurements of disk height. Mapping the overall disk topography using such measurements is possible. Additionally, the present invention may be used to determine the distance between the magnetic disk surface and the read/write head.

One method of measuring disk height is by measuring capacitive changes in a capacitance probe due to the varying distance between the capacitance probe and the surface of the magnetic storage disk. One possible technique for measuring this capacitance is to apply a high frequency AC signal between the capacitance probe and the storage disk surface. The capacitance due to the separation between the capacitance probe and the disk surface varies as a function of the distance between the two and may be calculated by measuring the current flow due to the applied high frequency AC voltage. This method lacks sensitivity and suffers from problems due to noise. Furthermore, the current flow through the capacitance probe is not linearly related to the distance between the probe and disk surface.

To compensate for the non-linear characteristic of the current flow, a linearizing stage having a transfer function characteristic inverse to that of the current flow through the capacitance probe may be added. This method of measuring height is very sensitive to the influence of stray capacitance. Typically, in order to limit the effect of stray capacitance, the detector circuit is integrated in the capacitance probe. This integrated capacitance probe is extremely delicate and quite expensive.

A second method of measuring capacitance due to the separation between a capacitance probe and magnetic storage disk is to apply a high frequency carrier signal (typically 5 MHz) and measure the drop in the amplitude of this carrier due to the probe/disk capacitor. The amplitude of the carrier will be proportional to the distance between the capacitance probe and the storage disk due to the varying capacitive load of the capacitance probe/disk capacitor. Changes in capacitance due to varying disk height are extremely small and their detection using this method requires very sensitive circuitry. To improve detection of the amplitude variations in the applied carrier signal, the amplitude of the 4 megaHertz carrier may be increased. Typically amplitudes may be as high as 80 volts. This method is both difficult and expensive to employ and still suffers from a high degree of sensitivity to stray capacitance. Furthermore, this high voltage level may present dangers to the operator. This method is not useful in measuring head flying heights because at heights of only 20 micro-inches, the 80 volt signal tends to arc to the disk surface, destroying the storage medium.

SUMMARY OF THE INVENTION

In accordance with the present invention, an alternating voltage is applied between the capacitance probe and the magnetic storage disk surface. The phase shift between the capacitance probe signal and a reference signal is measured and converted into a voltage output representative of the distance between the capacitance probe and the magnetic storage medium Circuitry is included to adjust the phase shift of the reference signal such that phase shift in the test probe signal due to stray capacitance may be calibrated out of the system. The invention includes cable compensation circuitry to improve sensitivity and linearity and cancel out capacitance due to transmission cabling.

In a preferred embodiment, the phase difference between the test probe output signal and the reference signal is measured by multiplying the probe signal with the reference signal and filtering out the high frequency components. This filtered output is representative of the distance between the . disk surface and the test probe and is inversely proportional to that distance. For small probe displacements, the relationship between output voltage and probe height is approximately linear. For large displacements, the filtered output may be applied to an amplifier including a stage whose output is proportional to the reciprocal of the input voltage. Thus, an output voltage is provided which varies in direct proportion, even for large displacements, to the distance between the capacitance test probe and surface of the magnetic disk.

The present invention has numerous advantages over the prior art including low susceptibility to stray capacitance, high sensitivity, and high linearity. The present invention provides a low cost, easily fabricated method for measuring distance based upon capacitance. In addition, dissimilar capacitance probes may be used with the same test circuitry, including flying heads, disk mapping probes and probes for measuring mechanical displacement (such as capacitive strain gage probes).

DETAILED DESCRIPTION OF THE PREFERRED EMBODIMENT

Figure 1:
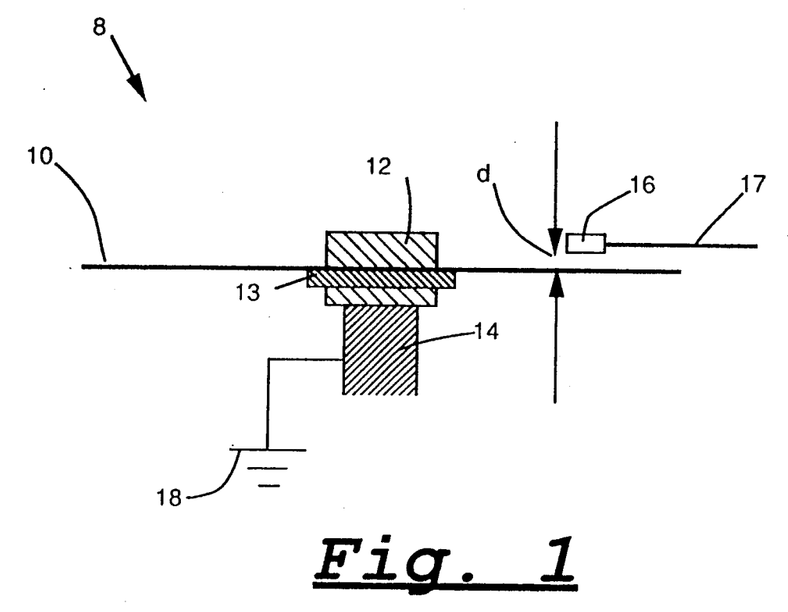
FIG. 1 is a side view of a magnetic storage disk and a capacitance test probe.

FIG. 1 shows a magnetic storage disk system 8 including magnetic storage disk 10 supported by a disk support ring 13 on a spindle 12. Spindle 12 is connected to spindle shaft 14. A capacitance probe 16 is positioned a distance above the surface of storage disk 10 on probe armature 17. In FIG. 1, this distance is shown as "d".

Also shown in FIG. 1 is electric ground 18 electrically connected to spindle shaft 14. Ground 18 is used to complete an electrical circuit between capacitance probe 16 and storage disk 10.

In typical operation, storage disk 10 is held on spindle 12 and is rapidly rotated by a motor (not shown) attached to spindle shaft 14. As disk 10 rotates, a magnetic read/write head (not shown, but which in one embodiment of the present invention may be attached to capacitance probe 16 and probe armature 17) is suspended above the surface of magnetic storage disk 10.

Due to the close proximity of the magnetic read/write head (not shown) to the surface of disk 10, the read/write head is said to "fly" over the surface of disk 10. This flying action allows the magnetic head to follow most changes in the contour of the surface of storage disk 10. The read/write head, however, "flies" so close to the disk surface that certain variations in disk height may lead to what is known as a "crash". A "crash" occurs when the read/write head comes in contact with the storage disk 10. Due to the high rate of rotation of storage disk 10 and the delicate nature of both the surface of disk 10 and the read/write head, a "crash" may seriously damage both the surface of disk 10 and the magnetic read/write head itself.

In addition to the potential for a "crash," an anomaly in the height of the surface of disk 10 may indicate areas which are unable to accurately retain the magnetic fields which represent the information stored on magnetic storage disk 10. Thus, for quality control reasons, it is important to accurately map the topographical features of the surface of storage disk 10 prior to using the disk for storage purposes.

During operation of magnetic storage disk system 8, it is important that the magnetic read/write head (not shown) be optimally placed above the surface of storage disk 10. A read/write head positioned to close to disk 10 may "crash" as described above. On the other hand, a read/write head positioned too far above the surface of magnetic storage disk 10 will provide a magnetic field too weak to write data on to disk 10. A read/write head too far above the surface of disk 10 will also have difficulty accurately reading the data recorded on disk 10. Thus it is extremely important during both production and during use of magnetic storage disk 10 to accurately measure distances above the surface of storage disk 10.

Figure 2:
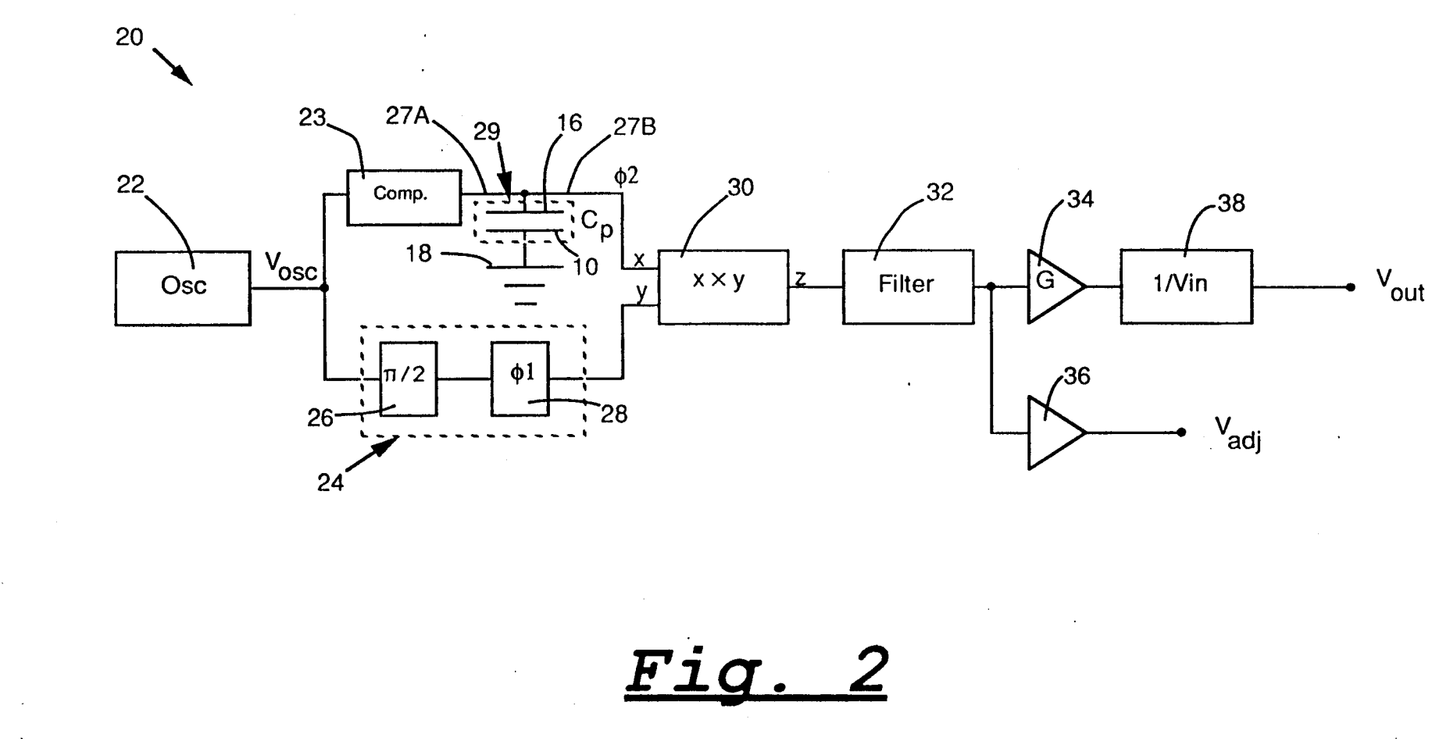
FIG. 2 is a block diagram of distance measuring circuitry in accordance with the present invention.

The block diagram of FIG. 2 shows circuitry in accordance with the present invention for accurately and inexpensively measuring the distance between capacitance probe 16 and magnetic storage disk 10. Measurement circuitry (designated generally at 20) comprises an oscillator 22 providing a sine wave output to capacitance probe 16 through cable compensation circuit 23 and to phase shift circuitry 24. The signal from cable compensation circuit 23 is carried to capacitance probe 16 through cable 27A. The return signal path from capacitance probe 16 is through a different portion of the same cable shown as cable 27B.

In the other leg of the split output from oscillator 22, phase shift circuitry 24 comprises a 90° phase shift circuit 26 and a variable phase shift circuit 28. This has been shown as separate circuit blocks 26 and 28, however a single phase shift circuit may be used to produce both phase shifts.

Capacitance probe 16 and storage disk 10 are shown schematically in FIG. 2 and form a capacitor 29 having a capacitance of $C_p$. This capacitance causes a shift in the phase angle of the component of the output of oscillator 22 going through cable compensation circuit 23 by an angle $\phi_2$. The component of the output of oscillator 22 going through phase shift circuitry 24 is shifted in phase by 90° plus angle $\phi_1$, where $\phi_1$ is an adjustable phase shift angle.

The component of the output of oscillator 22 applied to test probe 16 is recombined with the component of the output of oscillator 22 applied to phase shift circuitry 24 by multiplying circuitry 30. The output of multiplier circuit 30 is fed into filter 32 which comprises a low pass filter. In the preferred embodiment, filter 32 has a cut-off frequency of about 100 kHz. The output of filter 32 is split and applied to amplifiers 34 and 36. The output of amplifier 34 is fed into divider circuitry 38 which provides output $V_{out}$. Amplifier 36 provides a zero adjust voltage labelled $V_{adj}$ in FIG. 2.

In operation, capacitance probe 16 is placed above magnetic storage disk 10 as shown in FIG. 1. Capacitance probe 16 forms one plate of capacitor 29 having capacitance $C_p$ shown schematically in FIG. 2. Storage disk 10 forms the other plate of capacitor 29 which is connected to electrical ground 18. Oscillator 22 provides a stable output of 4 MHz (i.e. $V_{osc} = A \times \sin[2 \times \pi \times f \times t]$ where A is a constant, $f = 4$ MHz and t is time in seconds) in FIG. 2. The output of oscillator 22 is applied to both test probe 16 through cable compensation circuit 23 and to phase shift circuitry 24. The voltages at points x and y, the outputs of capacitor 29 and phase shift circuitry 24, respectively, in FIG. 2 are:

$$V_X = B \times \sin[2 \times \pi \times f \times \phi_2] \tag{1}$$

$$V_Y = C \times \sin[2 \times \pi \times f + \pi/2 + \phi_1] \tag{2}$$

where $\phi_2$ is the phase shift due to capacitor 29 formed by the spacing between capacitance probe 16 and storage disk 10 connected to electrical ground 18 and $\phi_1$ is a variable phase shift due to variable phase shift circuitry 28.

The voltage signals at points x and y are applied to multiplier circuit 30 in FIG. 2. Multiplier circuit 30 multiplies the two input voltage signals, $V_X$ with $V_Y$, and provides a voltage output at point z. The voltage from multiplier circuit 30 measured at point z is:

$$\begin{aligned} V_z &= K \times \sin[2 \times \pi \times f + \phi_2] \times \\ &\quad \sin[2 \times \pi \times f + \pi/2 + \phi_1] \\ &= -K \times \cos[2 \times \pi \times f + \phi_1] \times \\ &\quad \sin[2 \times \pi \times f + \phi_2] \\ &= -K/2 \times [\sin[\phi_1 - \phi_2] - \\ &\quad \sin[2 \times \pi \times 2 \times f + \phi_2 - \phi_1]] \end{aligned} \tag{3}$$

Where K equals $K_0 \times B \times C$. $K_0$ is the gain of multiplier circuit 30. As shown in the expansion of Equation 3, a high frequency component at $2 \times f$ (i.e 8 MHz) and a low frequency component whose signal varies as the difference between $\phi_1$ and $\phi_2$. As the distance between the capacitance probe 16 and disk 10 changes, the phase shift $\phi_2$ will change due to the varying capacitance of capacitance probe 16. The output of multiplier circuit 30 is passed through filter 32, which filters out the signal component at 8 MHz. The voltage at the output of filter 32 contains signals in the range of zero to 100 kHz and is:

$$V_{filter} = K_1 \times \sin[\phi 1 - \phi 2] \qquad (4)$$
$$\approx K_1 \times [\phi 1 - \phi 2]$$

This approximation is possible because the phase shift is extremely small, $\phi 1 - \phi 2 < 0.1$, and the error will be less than 0.1%.

The output of filter 32 is split and the signal is applied to both amplifier 34 and amplifier 36. Amplifier 36 provides a zero adjust voltage labelled $V_{adj}$ in FIG. 2. The output of amplifier 34 is applied to the input of divider circuit 38. Divider circuit 38 has a transfer function characteristic such that $V_{out} = 1/V_{in}$. This results in an output that is directly proportional to the height of capacitance probe 16 above the surface of magnetic storage disk 10. The voltage signal at $V_{out}$ is:

$$V_{out} = K_3 \times d \qquad (5)$$

Where d is the distance between capacitance probe 16 and storage disk 10 as shown in FIG. 1, and $K_3$ is an adjustable constant. $K_3$ may be calibrated by adjusting the amplification, G, of amplifier 34.

In operation, capacitance probe 16 is positioned over magnetic storage disk 10, at a distance from disk 10 such that only stray capacitance is present. Variable phase shift circuitry 28 is adjusted such that $\phi 1$ is equal to $\phi 2$. When $\phi 1$ equals $\phi 2$, the output of filter 32 will be zero. Referring to Equation 4 it is seen that $\phi 2$ and $\phi 1$ cancel out when $\phi 1$ equals $\phi 2$. This cancellation is done by monitoring the output of amplifier 36 labelled $V_{adj}$ in FIG. 2 such that $V_{adj}$ equals zero.

The circuit may be calibrated by placing capacitance probe 16 a known distance above storage disk 10 and adjusting the gain, G, of amplifier 34 such that $V_{out}$ from divider circuit 38 is at an appropriate voltage level.

When cable compensation circuit 29 consists of a single series resistor of resistance R, the phase shift $\phi_2$ may be represented as:

$$\phi 2 = \arctan[R \times C_T \times 2 \times \pi \times f] \qquad (6)$$

Where $C_T$ is the total capacitance and equals capacitance due to test probe 16, $C_p$, plus any stray capacitance, $C_s$, from the cable, circuitry, etc.

Figure 3:
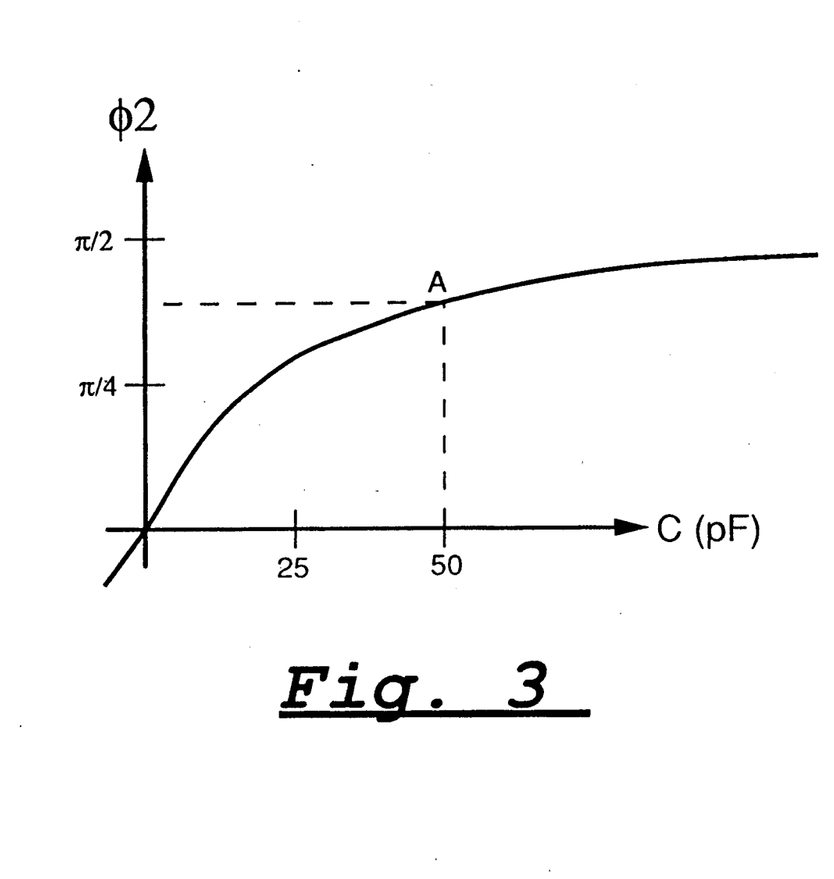
FIG. 3 is a graph of phase angle as a function of capacitance.

In FIG. 3, a graph of Equation 6 is shown. Typically, the stray capacitance, $C_s$, may be near 50 pF while the capacitance due test probe 16 may be in the range of 0.1-5 pF. Thus, the circuit will be operating around point A in FIG. 3 due to this comparatively large cable capacitance. This results in decreased sensitivity, as evident in FIG. 3, because the arctan curve near point A is relatively flat and even a large swing (1 pF for example) in the probe capacitance will result in only a small change in the value of $\phi 2$. The sensitivity near point A is only about 28%. Furthermore, the linearity of the output will be poor because the circuit will be operating at a point where the arctan function is substantially curved.

Large improvements in the sensitivity and linearity of the invention may be realized by moving the operation point away from A in FIG. 3 and closer to the origin of the graph where the arctan function is steeper and more nearly linear.

Figure 4:
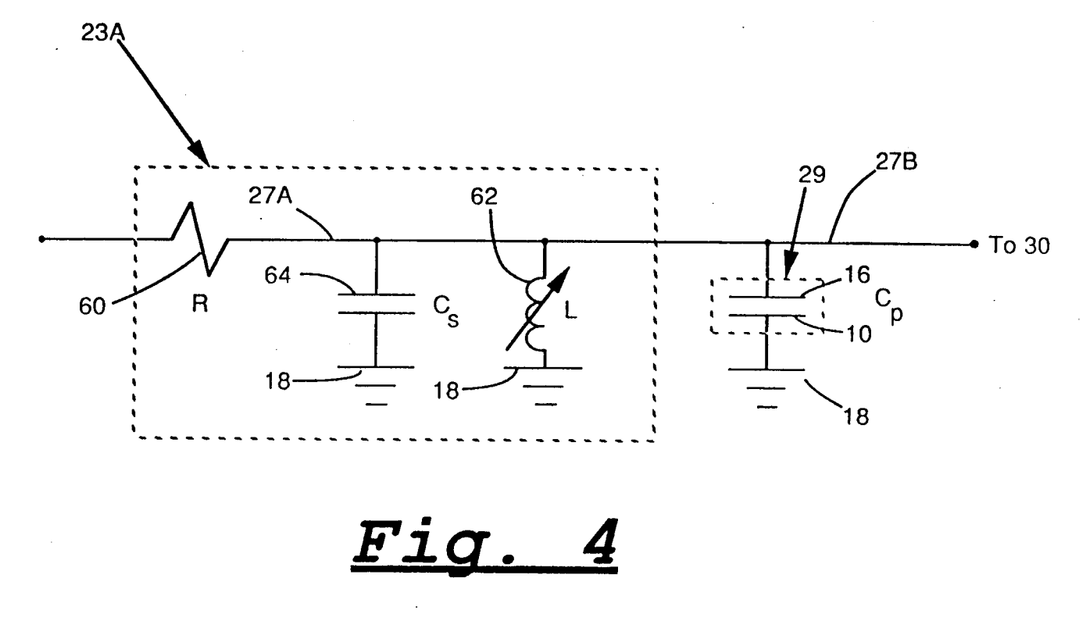
FIG. 4 is a schematic diagram of a first cable compensation circuit in accordance with the present invention.

One circuit that may be used as cable compensation circuit 23 for moving the operation point of the present invention closer to the origin of the graph in FIG. 3 is shown in FIG. 4 as 23A. Cable compensation circuit 23A comprises a resistor 60 having resistance R and variable inductor 62 having inductance L. The stray capacitance $C_s$ is shown as capacitor 64. To cancel out the effect of the stray capacitance, the inductance L of inductor 62 should adjusted such that:

$$L = [(2 \times \pi \times f)^2 \times C_s]^{-1} \qquad (7)$$

At this value the capacitance $C_s$ is "cancelled" at the frequency f, i.e. 4 MHz. If the cable is deformed or moved, however, the stray capacitance may change and the inductance L of inductor 62 will need to be readjusted to compensate for this change. Additionally, the change in capacitance will result in an error being introduced into the phase shift $\phi 2$. Circuit 23A is, however, adequate for use when cable lengths are short and probe capacitance is larger than 1 pF.

Circuit 23A is also useful for measuring head flying height as the capacitance being measured is quite large, greater than about 2 pF. For example, when the capacitance $C_p$ due to capacitance probe 16 is less than about 0.5 pF, the resistance of resistor 60 must be increased to obtain adequate measurement sensitivity. When $C_p$ is about 0.2 pF, resistor 60 should be about 25 kohm for the circuit to accurately measure the small changes in $C_p$ due to variations in disk height. Typically, the capacitance of the cabling used for cable 27A may be greater than 50 pF/meter. With such large cable capacitance and small probe/disk capacitance, the cable cannot be moved or the effects of uncompensated stray capacitance will introduce errors into the measurements. It would be desirable to obtain increased sensitivity without increasing the circuit's susceptibility to stray capacitance.

Figure 5:
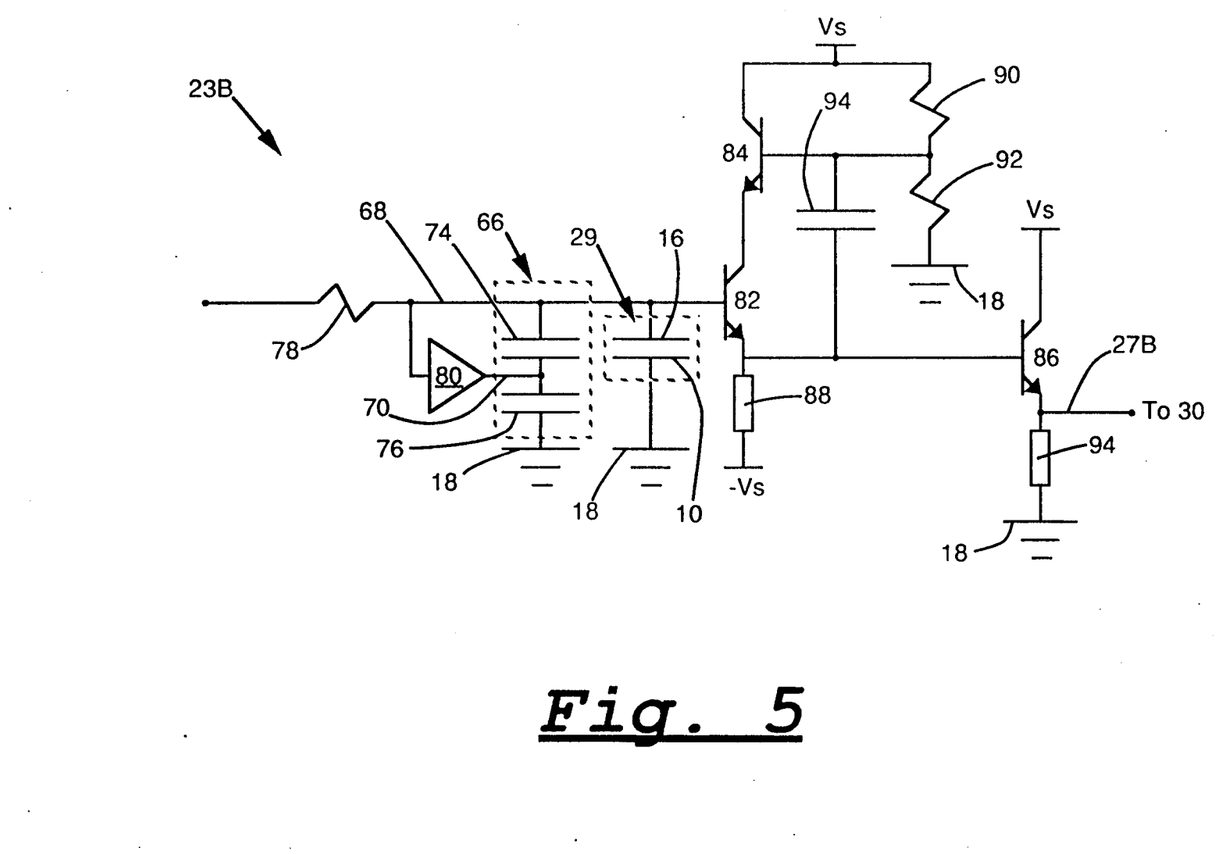
FIG. 5 is a schematic diagram of a second cable compensation circuit in accordance with the present invention.
Figure 6:
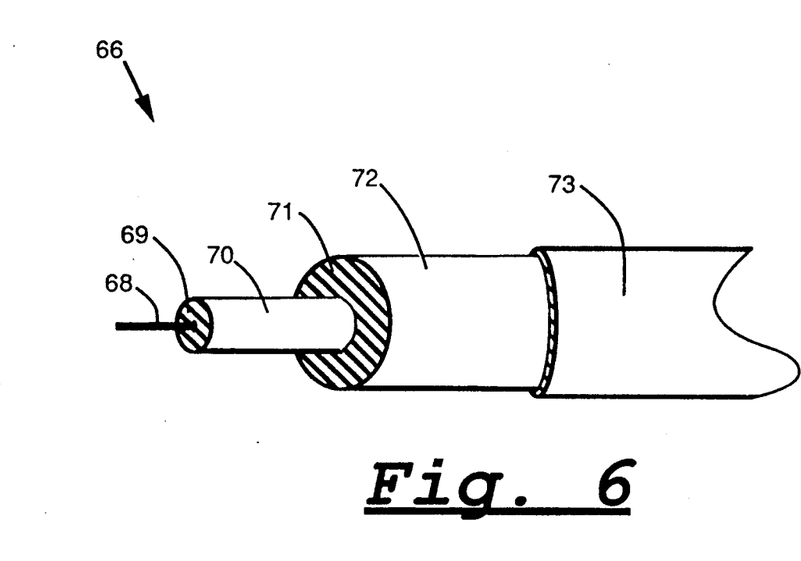
FIG. 6 is a plan view of tri-axial cable used in the cable compensation circuit of FIG. 5.

When extreme sensitivity is required, the cable compensation circuit 23B of FIG. 5 may be employed as an alternative to circuit 23A. Cable compensation circuit 23B not only moves the operation point of measurement circuitry 20 closer to the origin of the arctan curve of FIG. 3, but is also not susceptible to the problems associated with large cable capacitance. In cable compensation circuit 23B, a dual shield or tri-axial cable 66 shown in FIG. 6 is used for cable 27A. Tri-axial cable 66 comprises an inner conductor 68, an inner shield 70 and an outer shield 72. Insulator 69 separates inner conductor 68 from inner shield 70. Insulator 71 separates inner shield 70 from outer shield 72. Outer shield 72 is covered by insulator 73. A typical tri-axial cable 66 has a capacitance of about 50 pF/meter.

Referring again to FIG. 5, tri-axial cable 66 is shown electrically as capacitors 74 and 76. Capacitor 74 represents the capacitance between the inner conductor 68 and the inner shield 70 of triaxial cable 66. Capacitor 76 represents the capacitance between the inner shield 70 and the outer shield 72 of tri-axial cable 66. The output of oscillator 22 is connected to resistor 78. For sensitive measurements, resistor 78 should have a resistance of about 25 kohms. Resistor 78 connects directly to inner conductor 68 of tri-axial cable 66 and through a unity gain amplifier 80 to inner shield 70 of tri-axial cable 66. Outer shield 72 of cable 66 connects to electrical ground 18. Tri-axial cable 66 extends between resistor 78 and capacitor 29 formed by storage disk 10 and capacitance probe 16. Capacitor 29 connects to NPN transistors 82, 84 and 86. The base of transistor 82 connects to capacitor 29. The emitter of transistor 82 is connected the base of transistor 86 and to a negative supply voltage $-V_s$ through load 88. The collector of transistor 82 connects to the emitter of transistor 84. The collector of transistor 84 connects to a positive supply voltage $V_s$. The base of transistor 84 connects to bias resistors 90 and 92 and is electrically coupled to the emitter of transistor 82 through capacitor 94. The base of transistor 86 connects to the emitter of transistor 82. The collector of transistor 86 is connected to positive supply voltage $V_s$. The emitter of transistor 86 connects to electric ground 18 through load 94. Multiplying circuit 30 of FIG. 2 connects to the emitter of transistor 86 through cable 27B.

In operation, cable compensation circuit 23B of FIG. 5 effectively cancels out capacitors 74 and 76 due to tri-axial cable 66. Unity gain amplifier 80 drives the inner shield 70 of cable 66. Since unity gain amplifier 80 is connected across capacitor 74 (formed between inner conductor 68 and inner shield 70), no charge is built up on the plates of capacitor 74. Furthermore, any current caused to flow through capacitor 76 to electric ground 18 will be supplied by amplifier 80 and not through resistor 78. Only a small amount of current from resistor 78 flows into the base of transistor 82. Thus, almost all the current flowing through resistor 78 flows to ground through the disk/probe capacitor 29. As shown in Equation 6, above, the capacitance due to the cable is cancelled out, and $C_T$ will equal $C_p$.

The circuit formed by transistors 82, 84 and 86 provides even further accuracy in phase angle measurements. Transistor 82 is connected in an emitter-follower configuration such that the emitter of transistor 82 follows the voltage at the base of transistor 82. In the emitter-follower configuration, the capacitance formed between the base and emitter of transistor 82 does not load cable 68. Furthermore, transistor 84 is also connected as an emitter-follower such the collector of transistor 82 follows the emitter of transistor 82 due to AC coupling capacitor 94. Thus, neither the base-emitter capacitance nor the base-collector capacitance of transistor 82 affects the loading of cable 66. The output of transistor 82 is taken from its emitter and applied to transistor 86, also connected in an emitter-follower configuration. This signal is brought to multiplier circuit 30 in FIG. 2 through return cable 27B. Note that any capacitance due to cable 27B does not alter the phase of the return signal because this capacitance would appear in parallel with transistor 86.

A combination of the circuit 23B of FIG. 5 and the circuit 23A of FIG. 4 may also be used as cable compensation circuitry 23. By including a variable inductor, such as is used in circuit 23A, along with the cable driving circuitry of 23B, residual capacitance may be compensated. Using this configuration, transistor 84 and its associated circuitry is not necessary.

Figure 7:
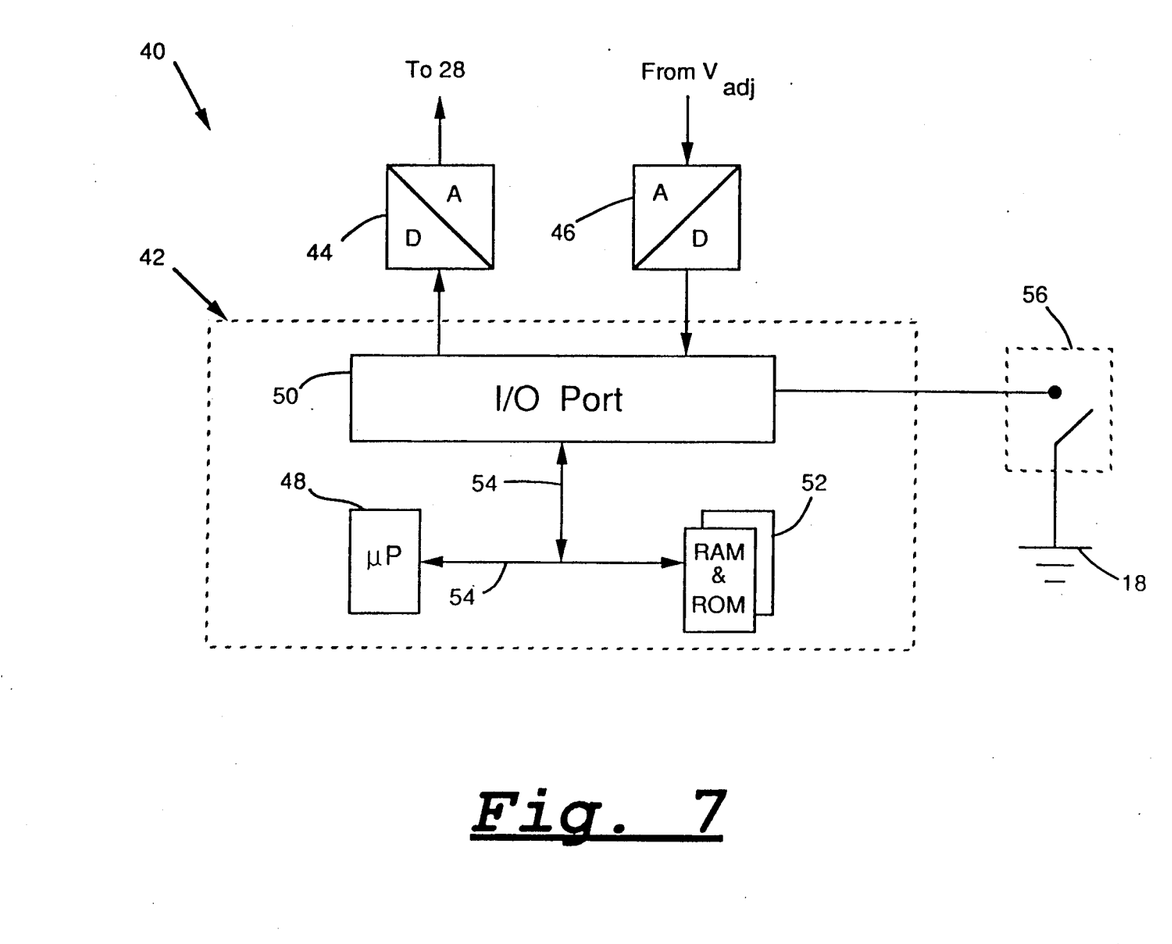
FIG. 7 is a block diagram of control circuitry for the distance measuring circuitry of FIG. 2.

A further development of the invention is shown in FIG. 7. Rather then repeatedly calibrating measurement circuitry 20 of FIG. 2, the microprocessor system of FIG. 7 may be employed. In FIG. 7, microprocessor 40 comprises microcontroller 42 and A/D convertors 44 and 46. Microcontroller 42 includes microprocessor 48, I/O port 50 and memory 52 comprising RAM and ROM all interconnected by data bus 54. A/D convertor 44 receives digital data from I/O port 50 and provides representative analog data to variable phase shift circuitry 28 in FIG. 2. A/D convertor 46, on the other hand, receives analog data from the output of amplifier 36, labeled $V_{adj}$ in FIG. 2, and provides a representative digital output to I/O port 50 in FIG. 7. Memory 52 provides temporary and permanent storage for microprocessor 48. Also shown in FIG. 7 is switch 56 which initiates the microprocessor controlled adjustment sequence.

In operation, capacitance probe 16 is placed a distance from the surface of magnetic storage disk 10 such that the only capacitance is due to stray capacitance. Switch 56 of FIG. 7 is then closed by an operator which initializes microprocessor system 40. Microcontroller 42 accepts data from A/D converter 46 which provides a digital representation of the phase difference between $\phi 1$ and $\phi 2$. Based upon this data, microprocessor 48 begins adjusting the digital output provided to A/D convertor 44 by I/O port 50 such that the output of A/D convertor 46 is set to zero. This microprocessor system is extremely useful because the circuit does not need to be manually calibrated each time measurement circuitry 20 is used.

The technique for measuring height above a magnetic storage disk described herein is useful for finding anomalies in a disk surface because it is simple, highly accurate and easy to use yet inexpensive to produce and maintain. The circuitry is also useful during disk operation for measuring the distance between the disk surface and the magnetic read/write head. The cable compensation circuitry provides even additional accuracy. The distance measuring method may be applied in many other situations where accurate displacement measurements are needed. For example, the method of measuring displacement is useful in any situation when physically touching the surface would be difficult or would alter the measured displacement value. Another possible use for the present invention is for strain gauge measurements. In a capacitance strain gauge, the capacitance probe is placed above the object under strain. As the object under strain deforms in a direction closer to or further away from the capacitance probe, the deflections may be measured as the phase shift varies as described above for a storage disk. The present invention may also be applied to read coded information where the code comprises a series of deformations in an object's surface.

One significant advantage of the present invention is its usefulness with different capacitance probes. The same circuitry may be used with capacitance probes having greatly varying electrical characteristics. For example, the same circuitry may be used with probes for measuring flying head height, mapping disk topography or mechanical displacement (such as in a capacitance strain gage).

Although the present invention is described with reference to preferred embodiments, workers skilled in the art will recognize that changes may be made in form and detail without departing from the spirit and scope of the invention.

What is claimed is:

1. A capacitance-type displacement measuring apparatus in a data storage system having a storage disk with a disk surface for providing an output signal as a function of distance between a test probe and the disk surface, the apparatus comprising:

means for providing a source signal;

means for applying the source signal to the test probe to produce a test probe signal having a first phase angle with respect to the source signal which is a function of the distance between the test probe and the disk surface;

means for receiving the source signal and providing a reference signal having a second phase angle with respect to the source signal;

a cable for carrying the test probe signal to the means for providing an output signal;

means for electrically isolating the test probe from the cable and cancelling effects of stray capacitance upon the first phase angle of the test probe signal, comprising:

a first transistor including collector, base and emitter, the base of the first transistor receiving the test probe signal;

a second transistor including collector, base and emitter, the base of the second transistor connected to the emitter of the first transistor, the emitter of the second transistor connected to the collector of the first transistor whereby the voltage difference between the collector and the base of the first transistor is substantially zero; and means for providing an output signal representative of the distance between the test probe and the disk surface as a function of the first phase angle of the test probe signal and the second phase angle of the reference signal.

2. The apparatus of claim 1 including a third transistor, the third transistor having collector, base and emitter, the base of the third transistor connected to the emitter of the first transistor.

* * * * *